United States Patent [19]
Ives

[11] 3,790,030
[45] Feb. 5, 1974

[54] LIQUID RESIN SPRAY DISPENSERS

[76] Inventor: Frank E. Ives, 1862 Ives Ave., Kent, Wash. 98031

[22] Filed: Nov. 8, 1971

[21] Appl. No.: 196,692

Related U.S. Application Data

[63] Continuation-in-part of Ser. No. 129,375, March 30, 1971, abandoned, Continuation of Ser. No. 696,190, Jan. 8, 1968, abandoned.

[52] U.S. Cl.................. 222/135, 138/40, 222/145, 222/148, 239/112, 239/414, 239/432, 259/4
[51] Int. Cl............................ B05b 7/04, B05b 7/12
[58] Field of Search... 239/414, 415, 427, 545, 498, 239/500, 112, 432; 259/4; 138/40; 222/135, 145, 148

[56] References Cited
UNITED STATES PATENTS

| | | | |
|---|---|---|---|
| 3,240,432 | 3/1966 | Boettler | 239/415 X |
| 3,366,337 | 1/1968 | Brooks et al. | 239/414 |
| 3,526,391 | 9/1970 | Church | 259/4 |
| 3,379,376 | 4/1968 | Williams | 239/545 X |
| 2,957,682 | 10/1960 | Cameron | 138/40 X |
| 2,970,773 | 2/1961 | Keryluk et al. | 239/415 X |
| 3,361,412 | 1/1968 | Cole | 239/427 X |
| 3,229,911 | 1/1966 | Carlson | 239/414 X |

FOREIGN PATENTS OR APPLICATIONS

| | | | |
|---|---|---|---|
| 544,231 | 11/1932 | Austria | 239/414 |

*Primary Examiner*—Robert B. Reeves
*Assistant Examiner*—Frederick R. Handren
*Attorney, Agent, or Firm*—Robert W. Beach

[57] ABSTRACT

Resin and catalyst, respectively, in unaerated liquid form are pumped from containers by interconnected pumps having a common drive motor and delivered in accurate proportions to a trigger-operated dispensing gun. The pump motor is controlled by back pressure of liquid delivered by a pump so that, when resin and catalyst control valves in the gun body are opened simultaneously, lowering the pressure in the supply lines, operation of the pump motor will be initiated automatically. To enable the relatively viscous resin and the relatively fluid catalyst to be supplied to the gun body in accurate proportions of the order of one-hundred times as much resin as catalyst by weight despite the employment of long lines, such as thirty feet, the catalyst supply line is a tube having in it a core rod to provide a restricted annular passage. Resin and catalyst supplied separately to the gun body pass through a tortuous mixing passage in the gun body for the purpose of mixing the resin and catalyst thoroughly before passage of the mixture through the spray gun aperture. The small mixing chamber in the gun body can be cleaned by supplying to it a suitable solvent, such as acetone, from a container connected to the gun body mixing camber by a tube. If desired, chopped reinforcing strand material can be blown into the resin spray to be deposited with the resin.

13 Claims, 13 Drawing Figures

LIQUID RESIN SPRAY DISPENSERS

This application is a continuation-in-part of application Ser. No. 129,375, filed Mar. 30, 1971, now abandoned which is a continuation of application Ser. No. 696,190 filed Jan. 8, 1968 for Liquid Resin Spray Dispensers, now abandoned.

A principal object of this invention is to spray a mixture of resin and catalyst in atomized liquid form without reliance on an air stream as a vehicle.

A further object is to provide such an atomized spray of liquid resin and catalyst mixture which is substantially uniform, constant and nonpulsating.

It is also an object to provide such an atomized spray of resin and catalyst liquid mixture which will contain accurate proportions of resin and catalyst despite the fact that the resin is much more viscous than the catalyst and the proportion of resin to catalyst is of the order of 100 to 1 by weight.

An additional object is to provide such a spray of atomized resin and catalyst liquid mixture at a considerable distance from the source of the liquid resin and catalyst, such as thirty feet, without reducing the uniformity of spray delivery and accuracy of resin-to-catalyst proportions in the mixture.

It is also an object to mix the resin and catalyst in the dispensing gun close to the mixture-dispensing aperture so that the dispensing operation can be interrupted at any time and resumed at any later time without the gun being clogged by set resin, simply by cleaning easily the small resin and catalyst mixing chamber in the gun body.

A further object is to provide apparatus for mixing the resin and catalyst thoroughly prior to being dispensed from the apparatus, while preventing the resin from flowing back through catalyst supply passages.

It is also an object to enable the dispensing operation to be interrupted at any time and resumed at a later time with minimum delay in adjusting the proper proportions of catalyst and resin in the mixture dispensed.

It has been customary heretofore to apply casting resin with an air-spray gun, such as used for spraying paint, in the use of which air under pressure constitutes the vehicle for the resin. An example of a resin which has been applied by the use of this technique is polyester resin. In some instances such a resin has been mixed with reinforcing fiber. The difficulty with such resin application technique has been that the process of depositing the resin is slow and the resulting deposited resin is inclined to have air bubbles in it. Also, it has been customary to apply such resin by an air-spray gun in the form of a mixture of resin, such as polyester resin, and a catalyst which conditions the resin for setting. Consequently, it has not been practical to interrupt a resin application operation for any appreciable period of time without emptying and cleaning the air-spray apparatus because otherwise the catalyzed resin would set in the apparatus.

The apparatus of the present invention is capable of depositing a liquid mixture of casting resin, such as unaerated liquid polyester resin, and an unaerated liquid catalyst without the use of air as a vehicle. By effecting mixture of the unaerated liquid resin and unaerated liquid catalyst just prior to its emission from the spray gun, if the spraying operation is to be interrupted for a substantial period of time all catalyzed resin can be removed quickly and easily from the apparatus. Also, the dispensing operation is facilitated by effecting mixing of the unaerated liquid resin and unaerated liquid catalyst automatically immediately prior to their ejection from the gun.

Figures 1, 9:
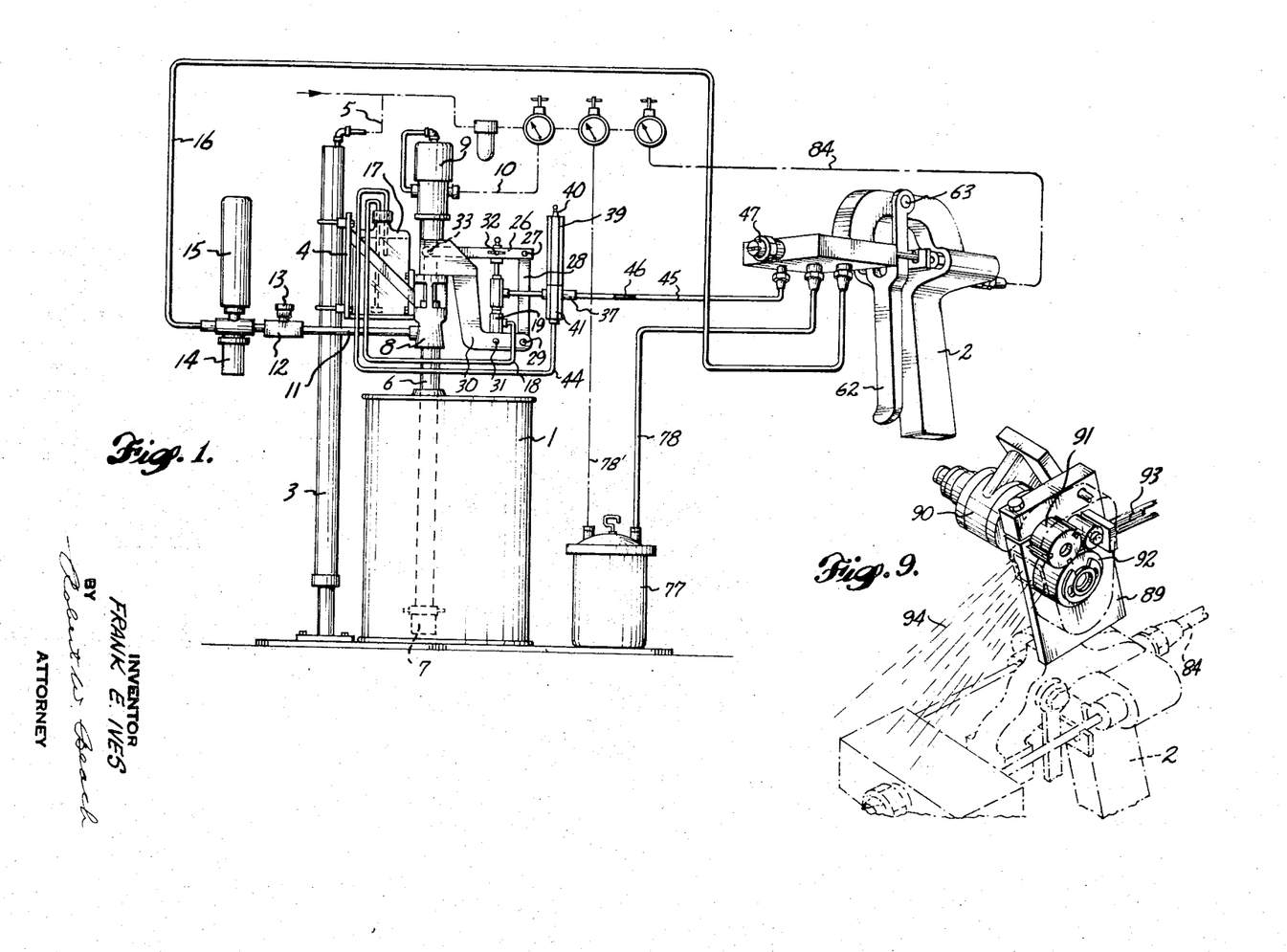
FIG. 1 is a somewhat diagrammatic view of the entire apparatus, parts of which are shown in elevation and other parts in perspective.
FIG. 9 is a top perspective of a chopped reinforcing strand dispenser attached to the dispensing gun.

The apparatus assembly shown in FIG. 1 includes a drum 1 containing resin which is withdrawn by the apparatus and projected in atomized unaerated liquid form from the spray gun 2. The dispensing apparatus is mounted principally on a supporting post 3 by a bracket 4. Preferably, the post is in the form of a fluid-operated jack which can be extended to raise the bracket 4 by supplying fluid under pressure through a supply line 5. The motive fluid may be air. The initial position of the apparatus with the jack in a given condition of extension can be altered by shifting the bracket position along the jack post.

A pump 6 has a lower end 7 which is inserted into an opening in the upper end of the resin container 1. Such pump may be of conventional reciprocating-piston type which raises the resin from the container to the pump discharge end 8. The pump is driven by a fluid piston motor 9 to which fluid under pressure, preferably air, is supplied through a supply line 10. Such pump can be controlled automatically by the back pressure in the resin discharge line 11 so that operation of the pump will be effected whenever the pressure in such discharge line drops below a predetermined value and the operation of the pump will continue until the pressure in the line has built up again to the critical control value.

The resin discharge line is connected to a flow-restricting needle valve 12 which is adjustable by turning knob 13 to establish the working pressure of the resin at a value between 200 and 600 psi. From such needle valve the resin passes through a conventional filter 14 into a conduit 16 to which an accumulator 15 is connected. Both of the filter and accumulator components are of conventional types. The filter may be of the corrosion-resistant metal screen type, such as being made of Monel metal and the accumulator may be of the bladder type. Because the resin pump 6 is of the piston type, it will pump the resin from the container 1 in surges. The accumulator 15 acts to reduce or damp the surging character of the resin flow so that the resin will flow from the accumulator to the gun 2 through the conduit 16 in a substantially steady stream at substantially a predetermined pressure.

In order to condition sprayed resin so that it will set after being deposited, it is necessary to mix with the resin, of polyester type, for example, a suitable catalyst. The apparatus of the present invention includes a jar or other container 17 containing catalyst. Such catalyst can be withdrawn from its container through a conduit 18 by a pump 19, the structure of which is shown in greater detail in FIG. 3 than in FIG. 1. Such catalyst can be pumped from its container through conduit 18 into the pump chamber 20 past a check valve 21 by reciprocation of a pump plunger 22 carrying a piston 23 which travels through the cylinder 20. As the piston 23 is moved downward, the check valve 21 will be closed by the pressure of the piston acting on the catalyst liquid in the pump barrel 20 so that such catalyst will be forced past a check valve in a passage of piston 23 to be discharged through an aperture 24 in the piston plunger.

In order to provide a proper setting action for the resin, at least a predetermined minimum proportion of catalyst to resin must be provided, but a greater amount of catalyst will expedite setting of the resin. To deliver a constant proportion of catalyst to resin, the catalyst and resin pumps, both being of the positive displacement type, can be interconnected and driven by the single fluid-pressure piston motor 9. Because the amount of catalyst required is very small in proportion to the amount of resin, such as approximately 1 percent by weight, the pump 19 for the catalyst has a much smaller capacity than the pump 6 for the resin. Also, these pumps can be interconnected so that the length of stroke of the catalyst pump 19 can be regulated at least to some extent to alter the proportion of catalyst to resin in the mixture dispensed by the apparatus.

Figures 2, 3, 10, 11, 12, 13:
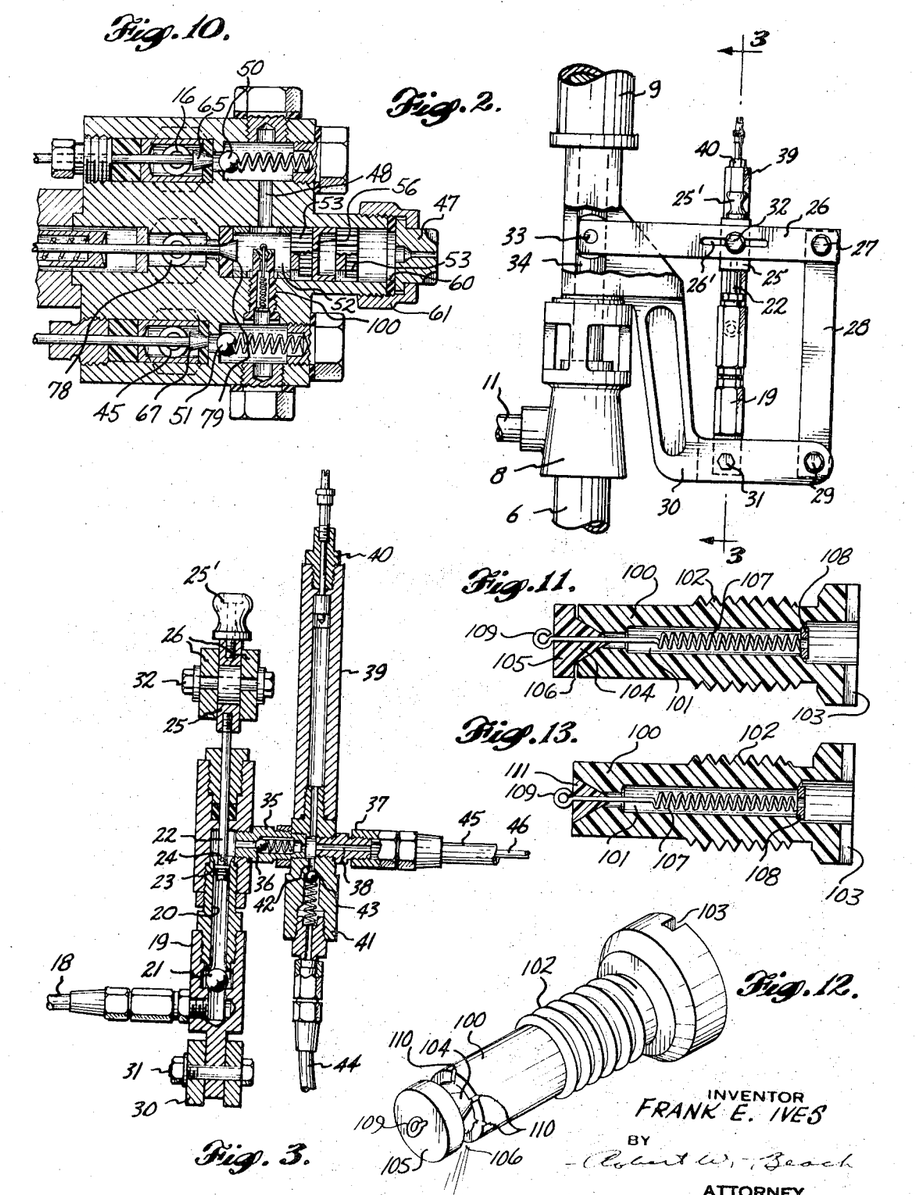
FIG. 2 is a side elevation of the resin and catalyst pump components of the apparatus, parts being broken away.
FIG. 3 is a vertical section through the catalyst pump and accumulator components of the apparatus.
FIG. 10 is a central horizontal section through a portion of the dispensing gun showing a somewhat modified construction.
FIG. 11 is a central longitudinal section through a component of the dispensing gun shown in FIG. 10.
FIG. 12 is a top perspective of such component.
FIG. 13 is a central longitudinal section through a component generally of the type shown in FIG. 11, but having a slightly different construction.

Variation in stroke of the plunger 22 of pump 19 for a given stroke of resin pump 6 can be effected by use of the pump structure shown best in FIGS. 2 and 3. The upper end of the plunger 22 is secured in a block 25 fitting between spaced bars 26 of a pump-actuating lever. Such bars are mounted by a pivot 27 on a link 28, which, in turn, is anchored by a pivot 29 to a fixed arm 30 of the pump frame. The lower end of the resin pump 19 is anchored to such arm by a pivot 31. The plunger-actuating block 25 is pivoted relative to the lever links 26 by a pivot rod 32 extending through slots 26' in the links 26. The lengths of such slots extend lengthwise of the links 26.

The ends of links 26 remote from link 28 are secured by a pivot pin 33 to the piston rod 34 of pump drive motor 9, as shown in FIG. 2. While the stroke of the pump-actuator rod 34 is constant and the pivot 27 of links 26 is substantially stationary, the stroke of the catalyst pump plunger 22 can be adjusted by shifting the pivot 32 in one direction or the other along slots 26'. Thus, movement of such pivot to the right, as seen in FIG. 2, will decrease the length of stroke of resin pump plunger 22 for a given length of stroke of the driving plunger 34, whereas shifting pivot 32 to the left, as seen in FIG. 2, along slots 26' will increase the length of stroke of the catalyst plunger 22. Such shifting of pivot 32 can be effected by grasping handle 25' on block 25 and sliding such block in one direction or the other along the lever.

From the pump 19 the catalyst is discharged into a conduit 35, shown in FIG. 3, in which a check valve 36 is located for preventing reverse flow to the pump cylinder during downward movement of piston 23. Conduit 35 communicates with a conduit 37 having a small duct 38. In order to reduce or damp surging flow resulting from the intermittent delivery of pump 19, an accumulator 39 is connected to the discharge conduit. An air valve 40 of conventional type is fitted in the upper end of the accumulator to which an air supply can be connected for establishing in the accumulator any desired air pressure.

To avoid operation of the positive displacement pump 19 increasing the pressure of the catalyst in the duct 38 to a value higher than necessary, a relief valve fitting 41 is connected to such discharge conduit. Such fitting has in it a passage 42 controlled by a check valve 43. Such check valve will open as may be necessary to avoid build-up of excessive pressure. Catalyst passing such check valve is returned to the container 17 through a conduit 44.

As has been mentioned above, the proportion of catalyst to resin in the final mixture is very small. Consequently, the flow through the catalyst conduit 45 from the catalyst supply duct 38 to the gun 2 will be relatively small. In addition, as has also been mentioned above, the catalyst is much less viscous than the resin. Consequently, in order to prevent a surge of catalyst to the gun during a dispensing operation, despite the inclusion of the accumulator 39, which would cause the pressure in the catalyst supply conduit 45 to drop precipitously, the passage through such supply conduit should be quite small.

It is desirable for the gun 2 to be capable of dispensing unaerated resin and catalyst mixture at a considerable distance from the resin container 1 and catalyst container 17, such as 30 feet away from such containers. It is difficult to provide a hose of such length with a minute bore through it for supply of the unaerated liquid catalyst and a hose of such length could become kinked to vary or even shut off the supply of catalyst so that the resin would not set. In addition, it would be extremely difficult, if not impossible, to clean the bore of such a hose. In the present invention the problem of providing an unaerated liquid catalyst supply hose having a small effective passage through it to produce sufficient resistance to flow of the catalyst is accomplished by a hose 45 having a comparatively large bore in which is inserted loosely a flexible plastic solid core rod 46, preferably of nylon, shown in FIG. 3 to form an annular capillary tube. The catalyst will flow from the supply duct 38 to the gun 2 through the restricted annular passage between the inner wall of hose 45 and such inserted nylon core rod.

The details of the resin spray dispensing gun are shown in FIGS. 4 to 8 inclusive. The unaerated liquid resin spray is discharged through a nozzle 47, the orifice through which can be formed to provide a more or less flaring conical spray, or a flat spray, as may be preferred. Nozzles to produce sprays of different shape are known in the art.

Figures 4, 5, 6, 7, 8:
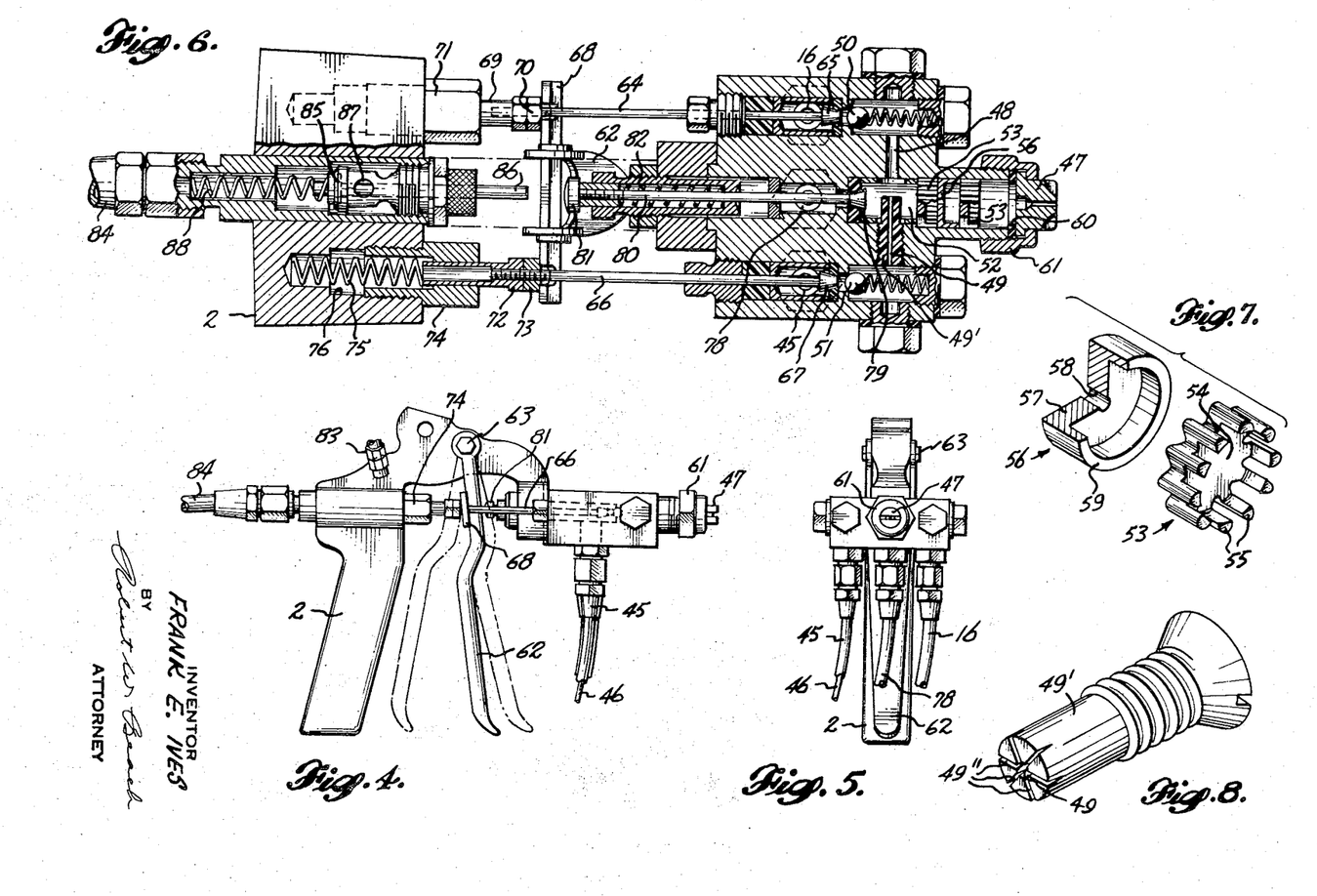
FIG. 4 is a side elevation of the dispensing gun and FIG. 5 is a front elevation of such gun.
FIG. 6 is a plan of the dispensing gun on an enlarged scale with parts being broken away and portions thereof being shown in section.
FIG. 7 is an enlarged top perspective of components of the dispensing gun having parts broken away and FIG. 8 is a top perspective of another component of the dispensing gun.

The resin supply conduit 16 supplies unaerated liquid resin to a bore 48 in the nozzle head, as shown in FIG. 6, and the catalyst supply conduit 45 supplies unaerated liquid catalyst to the passage 49 in such head. A check valve 50 provides a seal between the resin nozzle head bore 48 and the resin supply conduit 16 so as to prevent any possibility of catalyzed resin flowing into the resin supply conduit. Correspondingly, a check valve 51 is located between the catalyst passage 49 in the head and the catalyst supply conduit 45 to prevent any possibility of catalyzed resin flowing into the catalyst supply conduit. The resin supply duct 48 and the catalyst supply duct 49 both empty into the resin and catalyst mixing chamber 52.

It is important not only for the supply of unaerated liquid resin and unaerated liquid catalyst to the gun 2 to be proportioned correctly, but it is also important for such resin and catalyst to be mixed thoroughly into a homogeneous mixture so that setting of all portions of the resin will be effected. At the same time, the resin and catalyst unaerated liquid mixture should be atomized so that the resin will be retained on the surface onto which it is projected and the tendency for the resin to collect in drops and run down such surface, if it is inclined, will be minimized. The first step is to disperse the unaerated liquid catalyst into the unaerated liquid resin; the second step is to effect a mixing action of such resin and catalyst; and the third step is to atomize such mixture.

To disperse the unaerated liquid catalyst into the unaerated liquid resin, the resin supply duct 48 and the catalyst supply duct 49 in the gun body may be directed oppositely in alignment so that the resin and catalyst meet in opposing liquid streams. The catalyst supply duct 49 is formed in a bushing 49' screwed into the body so that the inner end portion of such bushing projects into the mixing chamber 52 to locate the opening of the catalyst supply duct generally at the center of the mixing chamber instead of being at one side of it. The bushing 49' preferably is made of plastic material inert to the catalyst and the resin, such as nylon. The inner end of this bushing has a plurality of radial notches 49'' cut in it, as shown in FIG. 8, so that catalyst passing through the bore 49 in the bushing is deflected by capillary attraction from alignment with the bore as it emerges from the inner bore end and flows generally along such grooves into spaced portions of the mixing chamber 52.

From the mixing chamber 52 the unaerated liquid resin and catalyst mixture follows a tortuous path to the nozzle 47 to effect thorough mixing of such resin and catalyst. Such a path is formed by the cooperation of a plurality of baffle members between the mixing chamber and the nozzle. Such baffle members are shown in detail in FIG. 7. Essentially, such baffle members are constructed so that one baffle member provides peripheral passages and an adjacent baffle member provides a central passage for the resin mixture.

Cooperating stacked baffle members of greater radial extent than axial extent are shown in detail in FIG. 7. A baffle member 53 providing for peripheral resin mixture passage includes a solid disk 54 forming one side of a cavity from the circumference of which fingers 55 project axially. Such fingers are spaced apart circumferentially of the baffle to provide grooves forming peripheral passages between them from the cavity side of the disk 54 to the other side of such disk. The other baffle member 56 includes a disk 57 spaced from disk 54 which has a central passage 58 through it for resin mixture. Such central passage is of a width less than half the width of the disk 57. The disk 54 is spaced from an adjacent disk on one side by the fingers 55. The disk 57 of a baffle member 56 on the other side of the same baffle member 53 can be held in spaced relationship to the disk 54 of such baffle member 53 to provide the cavity between the disks by an annular flange or rim 59 projecting from the disk 57. It is important that the radial thickness of the rim 59 be substantially less than the radial depths of the grooves between the fingers 55 so as to enable the cavity within the rim 59 of baffle member 56 to communicate with the peripheral passages formed by such grooves. While FIG. 6 shows one of the baffles 56 arranged between two baffles 53, any number of the baffles 53 and 56 could be utilized in alternating arrangement.

The baffles 53 and 56 are inserted in alternate arrangement into the bore closed by nozzle 47. This nozzle is removable and is secured to the end of such bore in sealed relationship to it by a washer 60, which may be of nylon, and a threaded retaining cap 61 apertured for projection of the nozzle through it. Dispensing of resin through such nozzle can be controlled by pulling trigger 62 from the solid-line position shown in FIG. 4 toward the broken-line position of such trigger to the left of the solid-line position. The trigger is mounted for swinging relative to the nozzle body and grip by a pivot 63.

Swinging of the trigger 62 relative to the nozzle body effects simultaneous movement of resin valve rod 64 to open the resin control valve 65 and of the catalyst control valve rod 66 to open catalyst control valve 67. Such simultaneous and coordinated reciprocation of valve rods 64 and 66 is effected by swinging of bar 68 carried by the trigger 62 to engage simultaneously the mounting devices for the two valve rods, respectively. The valve rod 64 is mounted in a plunger 69 into which it is threaded and is secured in place by a lock nut 70. The plunger 69 is guided for reciprocation relative to the gun body by being slidably received in a fitting 71. Correspondingly, the rod 66 of the catalyst valve is mounted in a plunger 72 by a threaded connection and a lock nut 73 secures these parts in place. The plunger 72 is slidably received in a bore of fitting 74 which is screwed into the gun body.

Springs 75 received in cavities 76 in the gun body bear against the plungers 69 and 72, respectively, to urge the resin valve rod 64 and the catalyst valve rod 66 to the right, as seen in FIG. 6, for holding the resin valve 65 and the catalyst valve 67 in closed position when the trigger 62 is not deflected from the solid-line position of FIG. 4. Moreover, when the trigger 62 is released by the operator from a position in which it has been swung to the left from the solid-line position of FIG. 4, the force of such springs will be transmitted through the plungers 69 and 72 and the lock nuts 70 and 73 to the yoke bar 68 carried by the trigger so as to swing the trigger back to the solid-line position of FIG. 4 while simultaneously closing the resin valve 65 and the catalyst valve 67.

If the catalyzed resin spray operation is to be interrupted for any substantial period of time during which the catalyzed resin might tend to set in the mixing chamber 52, such mixing chamber, the resin supply passage 48, the catalyst supply passage 49 and the passages from the mixing chamber 52 through the nozzle 47 can be cleaned easily without disassembling the gun. Such cleaning operation is effected by flushing such mixing chamber and passages with a resin solvent, such as acetone. Such flushing operation can be effected simply by pushing the trigger 62 forward instead of pulling it backward. The flushing solvent is stored in a container 77 from which it can be dispensed to the gun body through a solvent conduit 78 by supplying to the storage container 77 air under pressure through an air supply line 78'. Such storage container and the connections to it are shown in FIG. 1.

Supply of flushing solvent from the conduit 78 to the resin and catalyst mixing chamber 52 is controlled by a valve 79 mounted on the end of a valve rod 80. On the other end of this rod is a head 81 located to be engaged by the yoke bar 68 and pushed to the right, as seen in FIGS. 4 and 6, by swinging of the trigger 62 from the solid-line position of FIG. 4 toward the broken-line position at the right of such solid-line position. Opening of the valve 79 will admit the flushing solvent to the mixing chamber 52 from which it will flow through the resin supply duct 48 toward check valve 50 and through the catalyst supply duct 49 toward check valve 51 as well as through the tortuous passage defined by the baffles 53 and 56 to and through the nozzle 47.

In some instances, it may be desirable to dispense chopped reinforcing fiber, such as chopped glass roving, with the resin. Such fiber should be directed in the same direction as the stream of atomized resin projected by the nozzle 47 so that the resin and fiber would mix upon, or prior to, deposit of the fiber on the surface. A device for chopping and blowing the resultant chopped fiber in the same direction as the resin spray can be mounted on the resin gun 2, as shown in FIG. 9. For the purpose of propelling such chopped fiber, air can be supplied from a fitting 83 on the body of the gun, which is conveyed to the gun body through a conduit 84, shown in FIGS. 1, 4, 6 and 9.

Control of the discharge of air from fitting 83 is effected by a valve 85 opened by longitudinal movement of valve rod 86. Such movement is accomplished by swinging the trigger 62 from the solid-line position shown in FIG. 4 toward the broken-line position at the left of such solid-line position in that figure. By such movement of the trigger 62 the yoke bar 68 is swung into engagement with the adjacent end of the valve rod 86 to move the valve 85 into open position. When the valve has thus been opened, air will flow from the conduit 84 past the valve and out through the aperture 87 in the valve body to the fitting 83. When pressure on valve rod 86 is discontinued, the spring 88 will move valve 85 back again to its closed position to shut off the supply of air to the fitting 83.

A representative fiber strand chopper is shown in FIG. 9 as including the body 89 on which a rotary motor 90 is mounted. Such motor drives a chopping roller 91, the blades of which bear against a rotary backing roller 92 of rubber. The glass roving or other strand material 93 to be chopped is drawn between the chopping roller and the backing roller and the strand material is chopped so that the chopped fibers 94 fall from and are propelled by the action of rollers 91 and 92 in a direction to intersect the resin spray at the surface of the work or before such spray reaches that surface.

When the gun trigger 62 is in the solid-line position of FIG. 4, the resin supply valve 65, the resin passage check valve 50, the catalyst supply control valve 67, the catalyst passage check valve 51, the flushing solvent supply valve 79 and the chopper air supply valve 85 are all in their closed positions. Under such circumstances, high pressure is maintained in both the resin supply conduit 16 and the catalyst supply conduit 45 of the order of 200 psi. to 600 psi. Also, pressure is maintained in the flushing solvent supply conduit 78 and in the chopper air supply conduit 84. The pressure in the resin supply conduit will serve to interrupt operation of the pump motor 9.

When it is desired to perform a resin-spraying operation, trigger 62 will be drawn toward the left broken-line position in FIG. 4 by the hand of an operator grasping the stock of the gun. The operator can, of course, manipulate the gun when thus held to direct unaerated liquid resin spray issuing from the nozzle 47 in any desired direction. Such trigger movement will open resin valve 65 and catalyst valve 67 simultaneously so that the pressure of the resin and catalyst will press against the check valves 50 and 51 and open them to enable resin and catalyst to flow to the mixing chamber 52. The mixed resin and catalyst will flow from the mixing chamber through the tortuous passage and be discharged from the spray nozzle 47. Such delivery of catalyzed resin will continue as long as the trigger is pulled.

If a reinforcing strand chopper 89 is mounted on the resin gun, pulling the trigger 62 in the manner described will also effect a supply of air to the chopper so that chopped fiber will be mixed with the resin spray. When the trigger is released, springs 75 will close the resin valves 65 and 67 and return the trigger 62 to the solid-line position of FIG. 4. Such forward movement of the trigger will enable spring 88 to move valve 85 into closed position, thus cutting off the supply of air to the reinforcing strand chopper.

When it is desired to interrupt the resin-dispensing operation for a substantial period of time, the trigger 62 is simply swung toward the right in FIG. 4 into the broken-line position at the right of the solid-line position to unseat valve 79 so that flushing solvent will be forced through the resin and catalyst mixing chamber, the resin and catalyst supply ducts of the gun and the passages from the resin and catalyst mixing chamber 52 to the nozzle so as to dissolve and wash out of the gun all catalyzed resin. The trigger 62 is then released so that the spring 82 will return the valve 79 to closed position, cutting off supply of flushing solvent. The gun is then ready for immediate resumption of use simply by again pulling on the trigger as described above.

In such flushing operation of the structure shown in FIG. 6 the flushing liquid should go through passage 49 into the catalyst chamber in which valve 51 is located, so as to insure that any resin which might have penetrated through such passage will be washed out. Also the flushing liquid should go through resin passage 48 into the resin chamber ahead of check valve 50 to make sure that all resin which may have been mixed with any catalyst has been washed out of that chamber. When it is desired to resume the spraying operation, therefore, the initial spray is not used for resin application because it may contain flushing liquid, and consequently is discarded and wasted. Sufficient spray should thus be discarded to insure that catalyst and resin will have forced all cleaning fluid into the mixing chamber 52 and from such mixing chamber through the mixing baffle arrangement and out the orifice of the nozzle 47. The resin-applying operation should be deferred until the operator is sure that the proper mixture of resin and catalyst is being discharged from the nozzle 47.

In order to reduce waste of resin after cleaning of the gun and before a resin application operation is resumed, and further to improve the uniformity of resin and catalyst mixture, the nozzle construction shown in FIGS. 10 to 13 is preferred. In this construction a plug 100 replaces the plug 49' shown in FIG. 6, through which the catalyst supply duct 49 extends. The cross-sectional area of the catalyst supply duct 101 through the plug 100 is considerably greater than the cross-sectional area of the duct 49 over most of its length, but the end portions of such duct can be of approximately the same effective cross-sectional area as the duct 49.

The plug 100 shown in detail in FIG. 11 has external threads 102 for interengagement with internal threads in the port of the gun body communicating with the mixing chamber 52, as shown in FIG. 10. The plug can be screwed into this port by being inserted through a capped port in the exterior wall of the gun body and tightened into place by inserting a screwdriver bit into the slot 103 in the outer end of the plug.

Instead of the bore 101 being freely open to the mixing chamber 52 for access of flushing liquid to such bore, the inner end of such bore is flared conically outward to be closed by the conical boss 104 of valve 105 seating in such flared opening. The axial length of the conical portion of the valve head is greater than the axial length of the flared valve seat so that the flanged head of such valve will be spaced from the inner end of the plug 100 by an annular groove 106 when the valve is closed, as shown in FIG. 11. The head flange projects beyond the opening of the interior passage 101 of the plug transversely of such passage.

The valve 105 normally is pressed to its seat by a tension spring 107 having one end attached to an anchor 108 engaged with a shoulder of the bore 101. A rod 109 extends through the reduced portion of the catalyst passage 101 and through the valve 105. The rod end can be anchored in the valve by a loop formed in the end of the rod. The spring 107 will press the valve toward its closed position shown in FIG. 11, in which position it will seal the flared end of the catalyst duct 101 against entrance of flushing liquid into it.

When the catalyst supply pump 19 is pumping, however, the pressure of the catalyst against the underside of the valve cone 104 will force the valve open, such as to the position shown in FIG. 12. The catalyst will then spray into the mixing chamber 52 in a substantially annular sheet perpendicular to the length of the catalyst supply duct 101 and the length of the resin supply duct 48. In order to increase the mixing action of the catalyst with the resin in the mixing chamber it is preferred to provide a plurality of radial notches or grooves 101 in the inner end of the plug 100 as in FIG. 12, which are comparable to the radial notches 49'' shown in FIG. 8.

It is not necessary for the valve closing the flared opening of the catalyst bore 101 to have a head on it. The valve 111 shown in FIG. 13 is simply of conical shape, the outer end of which is disposed substantially flush with the inner end of the plug 100 when the valve is closed, as shown in FIG. 13. The action of this valve is the same as that of the valve 105, as described in connection with FIG. 11, except that the catalyst escaping past the opened valve may not flow from the inner end of the passage 101 in quite as flat a pattern. It is preferred that the inner end of the plug 100 shown in FIG. 13 also have radial grooves or notches, such as shown and described in connection with FIG. 12.

There are two principal advantages to providing the valve 104 of FIG. 11 or 111 of FIG. 13 for closing the end of passage 101 through plug 100 that opens into the mixing chamber 52. One advantage is that there is virtually no possibility of resin from the mixing chamber flowing inwardly past such a valve to mix with catalyst in the passage 101 as catalyst is flowing out of such passage. Consequently, resin and catalyst cannot set up in passage 101 and certainly cannot penetrate farther toward the check valve 51 to foul the catalyst passage.

The other advantage is that catalyst is maintained under pressure trapped between the outlet valve 104 or 111 and the check valve 51 when the operation of dispensing resin and catalyst mixture is interrupted, and even when the gun is disconnected from the resin supply line 16 and the catalyst supply line 45. Consequently, as soon as the trigger 62 is pulled to begin another resin and catalyst mixture dispensing operation, catalyst will immediately be dispensed from the passage 101 to the mixing chamber 52 to mix with resin without the necessity of preliminarily dispensing waste resin each time a delivery operation is initiated until the proper proportions of resin and catalyst for the mixture again have come into balance.

I claim:

1. Mechanism for dispensing an unaerated liquid catalyst and resin mixture comprising unaerated liquid resin pumping means for supplying unaerated liquid resin under pressure, unaerated liquid catalyst pumping means for supplying unaerated liquid catalyst under pressure, mixing means including a mixing chamber receiving unaerated liquid resin under pressure from said resin pumping means and a catalyst supply member having an interior passage for flow of catalyst therethrough from said catalyst pumping means to said mixing chamber, said catalyst supply member having an end face around said interior passage, exposed to said mixing chamber and having elongated grooves depressed in said end face, the lengths of said grooves radiating outwardly from said interior passage and the inner ends of said grooves opening into said interior passage, said radiating grooves dispersing into liquid resin within said mixing chamber catalyst flowing from the interior passage of said catalyst supply member, and discharge means for discharge of resin and catalyst mixture from said mixing means.

2. The mechanism defined in claim 1, and tortuous passage means connecting the mixing chamber and the discharge means for effecting further mixing of resin and catalyst flowing therethrough.

3. The mechanism defined in claim 1, a resin supply duct connecting the resin pumping means to one side of the mixing chamber, the catalyst supply member connecting the catalyst pumping means to the opposite side of the mixing chamber, and the openings into the mixing chamber of said resin supply duct and of the catalyst supply member interior passage being substantially aligned with each other and directed in opposite directions.

4. The mechanism defined in claim 1, the catalyst supply member having an end portion projecting a substantial distance into the mixing chamber the end face of which is disposed around the interior passage.

5. Mechanism for dispensing an unaerated liquid catalyst and resin mixture comprising unaerated liquid resin pumping means for supplying unaerated liquid resin under pressure, unaerated liquid catalyst pumping means for supplying unaerated liquid catalyst under pressure, mixing means including a mixing chamber receiving unaerated liquid resin under pressure from said resin pumping means and unaerated liquid catalyst under pressure from said catalyst pumping means and mixing them in said mixing chamber, and discharge means for discharge of resin and catalyst mixture from said mixing means, said mixing means further including tortuous passage means connecting said mixing chamber and said discharge means for effecting further mixing of resin and catalyst flowing therethrough, said tortuous passage means having an internal cavity with a flat wall at one side thereof, centrally-located passage means communicating with the side of said internal cavity opposite said flat wall for flow of both resin and catalyst therethrough toward said flat wall and a multiplicity of peripheral passages arranged around the margin of said flat wall and communicating with said internal cavity for flow of both resin and catalyst therethrough.

6. The mechanism defined in claim 5, in which the tortuous passage means includes a plurality of stacked baffle disks, each baffle disk having peripheral fingers projecting axially from the margin thereof with grooves therebetween forming the peripheral passages, said fingers effecting spacing of the peripheral passages from an adjacent baffle disk.

7. Mechanism for dispensing an unaerated liquid catalyst and resin mixture comprising unaerated liquid resin pumping means for supplying unaerated liquid resin under pressure, unaerated liquid catalyst pumping means for supplying unaerated liquid catalyst under pressure, mixing means connected to said resin pumping means for receiving unaerated liquid resin under pressure therefrom and also connected to said catalyst pumping means for receiving unaerated liquid catalyst under pressure therefrom and mixing said resin and catalyst, discharge means for discharge of resin and catalyst mixture from said mixing means, flushing solvent supply means connected to said mixing means at the same time that said resin pumping means and said catalyst pumping means are connected to said mixing means for supplying solvent thereto to flush out of said mixing means and said discharge means catalyst and resin mixture residue, and trigger control means movable in one direction to control discharge of resin and catalyst mixture from said mixing means and movable in a different direction to control supply of flushing solvent to said mixing means.

8. Mechanism for dispensing an unaerated liquid catalyst and resin mixture comprising unaerated liquid resin positive displacement pumping means for supplying unaerated liquid resin under pressure, unaerated liquid catalyst positive displacement pumping means for supplying unaerated liquid catalyst under pressure, pump-driving means for driving both of said pumping means in synchronism, mixing means, resin conduit means connecting said resin pumping means to said mixing means for delivering unaerated liquid resin to said mixing means, catalyst conduit means connecting said catalyst pumping means to said mixing means for delivering unaerated liquid catalyst to said mixing means and including a catalyst supply hose and a flexible solid core rod of plastic material received in the bore of said catalyst supply hose to form a small annular passage providing high resistance to flow of liquid catalyst therethrough, first accumulator means connected to said resin conduit means to damp surging of resin flow to said mixing means, second accumulator means connected to said catalyst conduit means to damp surging of catalyst flow to said mixing means, and discharge means for discharge of resin and catalyst mixture from said mixing means.

9. Mechanism for dispensing an unaerated liquid catalyst and resin mixture, comprising unaerated liquid resin pumping means for supplying unaerated liquid resin under pressure, unaerated liquid catalyst pumping means for supplying unaerated liquid catalyst under pressure, mixing means including a mixing chamber having outlet means in one side thereof, receiving unaerated liquid resin under pressure from said resin pumping means through a passage directed generally transversely of the direction of flow of catalyst and resin mixture through said outlet means, and a catalyst supply member having an interior passage for flow of catalyst therethrough from said catalyst pumping means to said mixing chamber directed generally transversely of the direction of flow of catalyst and resin mixture through said outlet means and opposite to said liquid resin passage and having a valve at the discharge end of said interior passage operable to close the mixing chamber end of said interior passage for preventing flow of liquid from said mixing chamber into said interior passage of said catalyst supply member.

10. The mechanism defined in claim 9, in which the valve includes an annular flange projecting beyond the opening of the interior passage transversely of such passage.

11. Mechanism for dispensing an unaerated liquid catalyst and resin mixture, comprising unaerated liquid resin pumping means for supplying unaerated liquid resin under pressure, unaerated liquid catalyst pumping means for supplying unaerated liquid catalyst under pressure, mixing means including a mixing chamber having outlet means in one side thereof, receiving unaerated liquid resin under pressure from said resin pumping means through a passage directed generally transversely of the direction of flow of catalyst and resin mixture through said outlet means, and a catalyst supply member extending through an inner wall of said mixing chamber and having an interior passage opening through the inner end of said catalyst supply member for flow of catalyst therethrough from said catalyst pumping means to said mixing chamber, the inner end portion of said catalyst supply member projecting into said mixing chamber a substantial distance beyond the inner wall of said mixing chamber through which said catalyst supply member extends with the passage through said catalyst supply member being directed generally transversely of the direction of flow of catalyst and resin mixture through said outlet means and opposite to said liquid resin passage.

12. The mechanism defined in claim 11, in which the inner end portion of the catalyst supply member projects into the mixing chamber beyond its inner wall at least approximately one-half the width of the mixing chamber measured in a direction parallel to the length of the interior passage extending through the catalyst supply member.

13. Mechanism for dispensing an unaerated liquid catalyst and resin mixture, comprising unaerated liquid resin pumping means for supplying unaerated liquid resin under pressure, unaerated liquid catalyst pumping means for supplying unaerated liquid catalyst under pressure, mixing means including a mixing chamber receiving unaerated liquid resin under pressure from said resin pumping means and unaerated liquid catalyst under pressure from said catalyst pumping means and mixing them in said mixing chamber, and discharge means for discharge of resin and catalyst mixture from said mixing means, said mixing means further including a plurality of stacked baffle disks of greater radial extent than axial extent located between said mixing chamber and said discharge means, one baffle disk having a central aperture of a width less than half the radial width of such disk and an adjacent baffle disk having fingers projecting axially from the margin thereof with grooves therebetween forming peripheral passages spaced outwardly from said central aperture, said fingers effecting spacing of the peripheral passages from an adjacent baffle disk, said central aperture and said peripheral passages cooperatively forming tortuous passage means between said mixing chamber and said discharge means for effecting further mixing of resin and catalyst flowing therethrough.

\* \* \* \* \*

UNITED STATES PATENT OFFICE
CERTIFICATE OF CORRECTION

Patent No. 3,790,030    Dated February 5, 1974

Inventor(s) Frank E. Ives

It is certified that error appears in the above-identified patent and that said Letters Patent are hereby corrected as shown below:

In the Abstract on title page, 3rd line from bottom, cancel "camber" and insert --chamber--.

Column 2, line 30, after "automatically" insert --in a mixing chamber in the gun--.

Column 5, line 32, after "formed" insert --as an interior passage--; same line, cancel "bushing" and insert --catalyst supply bushing member--; line 33, after "bushing" insert --member--; line 37, after "bushing" insert --member--; line 39, after "end" insert --face--; same line, after "bushing" insert --encircling the interior catalyst passage--; line 40, cancel "notches" and insert --grooves--; line 41, cancel "bore" and insert --duct--; line 43, cancel "bore" (in both instances) and insert --duct--.

Claims 1, 9 and 11 read as follows:

-- 1. Mechanism for dispensing an unaerated liquid catalyst and resin mixture comprising unaerated liquid resin pumping means for supplying unaerated liquid resin under pressure, unaerated liquid catalyst pumping means for supplying unaerated liquid catalyst under pressure, mixing means including a mixing chamber receiving unaerated liquid resin under pressure from said resin pumping means and unaerated liquid catalyst under pressure from said catalyst pumping means, a catalyst supply member having an interior passage for flow of catalyst therethrough into said mixing chamber, said catalyst supply member having an end face encircling said interior passage, exposed to said mixing chamber and having elongated grooves depressed in said end face, the lengths of said grooves radiating outwardly from said interior passage and the inner ends of said grooves opening into said interior passage, said radiating grooves dispersing into liquid resin within said mixing chamber catalyst flowing from the interior passage of said catalyst supply member, and discharge means for discharge of resin and catalyst mixture from said mixing means.

UNITED STATES PATENT OFFICE
CERTIFICATE OF CORRECTION

PJ-1050
(5/69)

Patent No. 3,790,030　　　　　　　　Dated February 5, 1974

Inventor(s) Frank E. Ives

It is certified that error appears in the above-identified patent and that said Letters Patent are hereby corrected as shown below:

9. Mechanism for dispensing an unaerated liquid catalyst and resin mixture, comprising unaerated liquid resin pumping means for supplying unaerated liquid resin under pressure, unaerated liquid catalyst pumping means for supplying unaerated liquid catalyst under pressure, mixing means including a mixing chamber having outlet means in one side thereof, receiving unaerated liquid resin under pressure from said resin pumping means through a passage directed generally transversely of the direction of flow of catalyst and resin mixture through said outlet means and also receiving unaerated liquid catalyst under pressure from said catalyst pumping means, and a catalyst supply member having an interior passage for flow of catalyst therethrough into said mixing chamber directed generally transversely of the direction of flow of catalyst and resin mixture through said outlet means and opposite to flow of resin through said liquid resin passage and having a valve at the discharge end of said interior passage operable to close the mixing chamber end of said interior passage for preventing flow of liquid from said mixing chamber into said interior passage of said catalyst supply member.

11. Mechanism for dispensing an unaerated liquid catalyst and resin mixture, comprising unaerated liquid resin pumping means for supplying unaerated liquid resin under pressure, unaerated liquid catalyst pumping means for supplying unaerated liquid catalyst under pressure, mixing means including a mixing chamber having outlet means in one side thereof, receiving unaerated liquid resin under pressure from said resin pumping means and also receiving unaerated liquid catalyst under pressure from said catalyst pumping means, a resin supply passage directed generally transversely of the direction of flow of catalyst and resin mixture through said outlet means for supplying unaerated liquid resin to said mixing chamber, said resin supply passage having an opening into said mixing chamber

PO-1050
(5/69)

UNITED STATES PATENT OFFICE
CERTIFICATE OF CORRECTION

Patent No. 3,790,030　　　　　Dated February 5, 1974

Inventor(s) Frank E. Ives

It is certified that error appears in the above-identified patent and that said Letters Patent are hereby corrected as shown below:

--substantially flush with an inner wall of said mixing chamber, and a catalyst supply member extending through an inner wall of said mixing chamber and having an interior passage opening through the inner end of said catalyst supply member for flow therethrough to said mixing chamber of a much smaller quantity of catalyst than the quantity of resin supplied simultaneously through said resin supply passage to said mixing chamber, the inner end portion of said catalyst supply member projecting into said mixing chamber a substantial distance beyond the inner wall of said mixing chamber through which said catalyst supply member extends with the passage through said catalyst supply member being directed opposite to said resin supply passage and generally transversely of the direction of flow of catalyst and resin mixture through said outlet means.--

Signed and sealed this 3rd day of September 1974.

(SEAL)
Attest:

McCOY M. GIBSON, JR.
Attesting Officer

C. MARSHALL DANN
Commissioner of Patents